Jan. 14, 1941.   H. B. DRAPEAU   2,228,446
COOLING CIRCULATING SYSTEM FOR MARINE ENGINES
Filed May 25, 1937
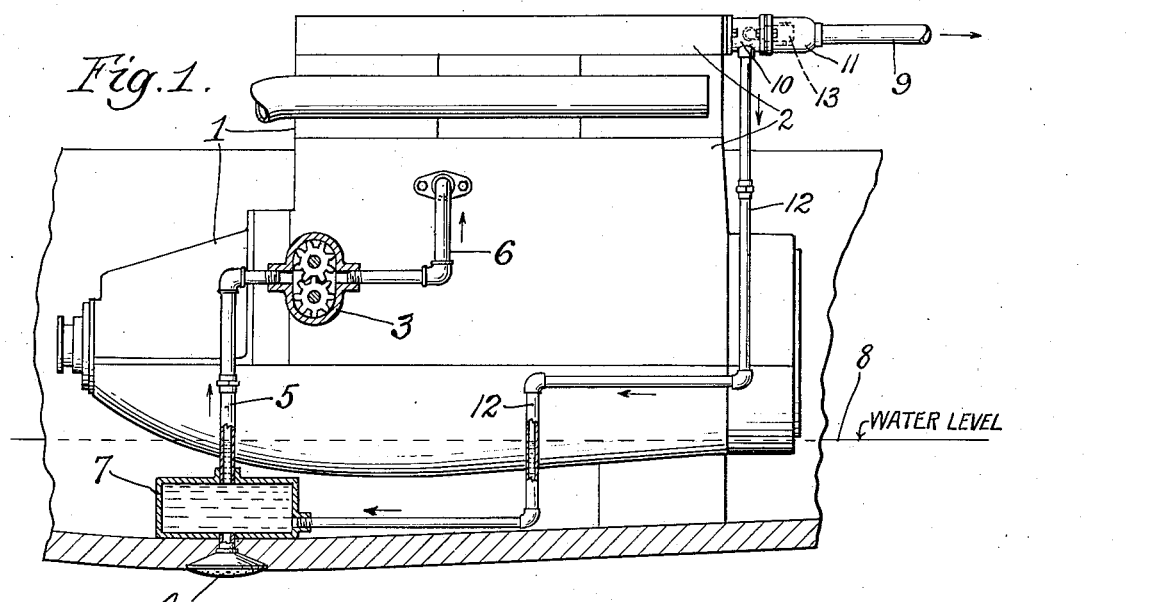
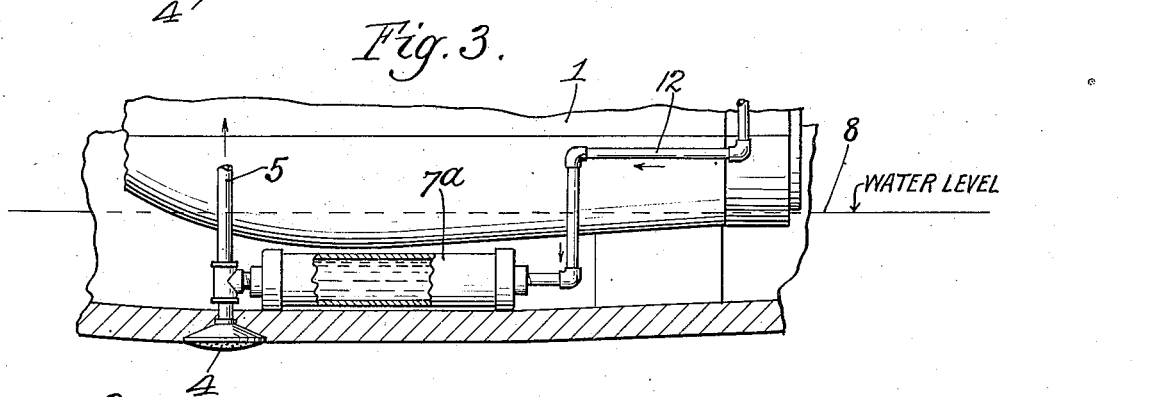
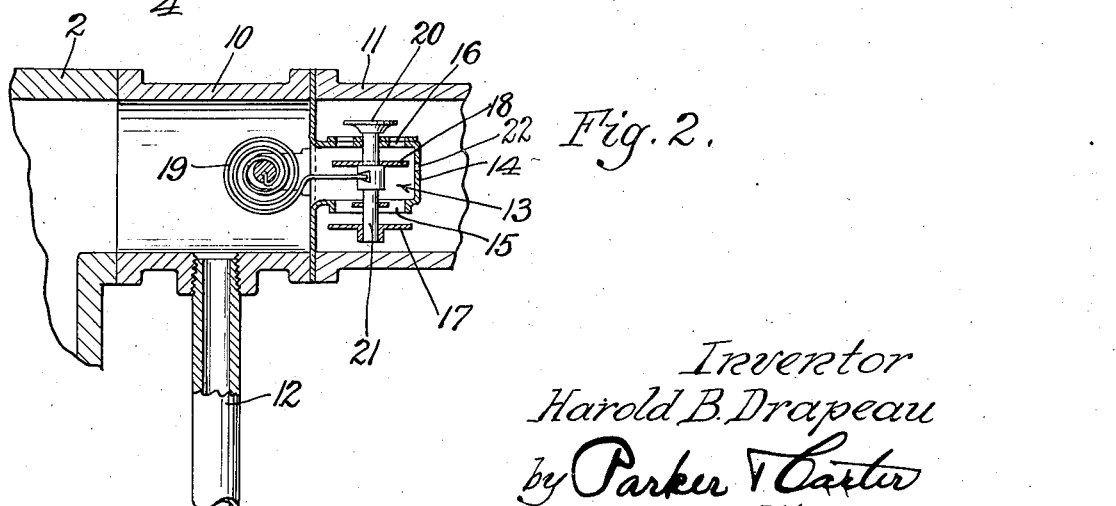
Inventor
Harold B. Drapeau
by Parker & Carter
Attorneys.

Patented Jan. 14, 1941

2,228,446

UNITED STATES PATENT OFFICE 2,228,446

COOLING CIRCULATING SYSTEM FOR MARINE ENGINES

Harold B. Drapeau, Oak Park, Ill., assignor to The Dole Valve Company, Chicago, Ill., a corporation of Illinois Application May 25, 1937, Serial No. 144,726

2 Claims. (Cl. 123—178)

This invention relates to cooling circulating systems for marine engines and has for its object to provide a new and improved system of this description.

The invention has as a further object to provide a circulating system for marine engines which will be cheap to construct and efficient in operation.

In the usual marine engines the water for cooling the engine is taken from the water in which the boat is traveling and forced through the engine jacket by a pump and then forced out into the water in which the boat is traveling. This makes it difficult to provide a thermostatically controlled system because the pressure exerted by the pump causes the thermostat to open.

One of the objects of the present invention is to provide a circulatory system for marine engines by means of which a thermostat can be used and which will be free of the objections heretofore present in such systems.

The invention has further objects which are more particularly pointed out in the accompanying description.

Referring now to the drawing:

Figure 1 is a view showing one form of marine engines embodying the invention;

Figure 2 is a sectional view at the point where the water is discharged from the engine jacket; and Figure 3 is a view with parts broken away showing a modified construction.

Like numerals refer to like parts throughout the specification and drawing.

Referring now to the drawing wherein I have shown one form of device embodying the invention, there is illustrated one form of marine engine 1, having an engine cooling jacket 2 through which the cool water is circulated to cool the engine. These engines may be any form of engine, including Diesel engines. As herein shown, the water is drawn by means of a pump 3, which is shown as a gear pump, through the strainer 4 which communicates with the water in which the boat is traveling. The water passes through the pipe 5 to the pump 3. There is a pipe 6 leading from the pump to the engine jacket. In the construction shown in Figure 1, there is a reservoir 7 which connects with the pipe 5 for containing water. This reservoir, or at least the bottom portion of it, is located below the water line 8 of the water in which the boat is traveling. There is a discharge pipe 9 through which water, as hereafter set out, is discharged from the water jacket. This pipe connects with the water jacket in any desired manner as by means of the fittings 10 and 11. A by-pass 12 connects the outlet and inlet of the engine water jacket. In the construction shown in Fig. 1, the reservoir 7 communicates with the by-pass 12 and the pipe 5 and the by-pass 12 communicates with the fitting 10 and a thermostat 13 is located in the fitting 11 beyond the end of by-pass. This thermostat may be of any desired form and I have illustrated a balanced thermostat having a casing 14, see Fig. 2, with a bleeder opening 22 and two ports 15 and 16 controlled by the valve members 17 and 18. These valve members are located on a member 21 to which is connected a thermostatic element 19 located in the path of the water which passes through the by-pass 12. This balanced valve has an auxiliary member 20 for the purpose of taking care of the pressure due to the flowing of the water through the valve to maintain its proper balanced condition. In the construction shown in Figure 3, instead of having a reservoir 7, the by-pass 12 is provided with an enlargement 7a which contains water.

In these marine engines, when the engine is stopped the pump stops and the water drains out of the engine jacket. If the by-pass, for example, is connected to the pipe 5, the engine when started up, the pump being also then started up, the pump will draw air and hence no water will be pumped into the engine jacket and the engine become overheated and injured and perhaps destroyed. The essential thing in this construction is to provide means for preventing this condition, and I have illustrated a means wherein I provide a water seal for the by-pass, thus insuring the pump always drawing water when it is first started up.

If the cold water taken from the body of water in which the boat is located, is pumped directly into the engine water jacket, the water in the engine water jacket will have a wide temperature difference at the point of entrance and the point of discharge from the water jacket. This not only sets up injurious stresses in the engine, but adversely affects the engine performance. By means of the present device, this evil is eliminated, for the water in the by-pass when the engine is operating, provides means for preheating the intake water by mixing with it, and this substantially equalizes the temperatures at the engine jacket inlet and an outlet during actual operation.

The use and operation of my invention are as follows: When the device for example shown in Figure 1 is in operation, the pump pumps the water through the engine jacket and through the by-pass, thus recirculating the water. When the water reaches a predetermined temperature, that is, a temperature at which it is desired to have the engine operate, the thermostat 19 opens the valve members 17 and 18 and heated water is discharged through the pipe 9 out to the outside of the boat. Cold water is then drawn by the pump through the strainer 4, and this cools down the water in the jacket and causes the thermostat 19 to close the valves 17 and 18. It will thus be seen that there is an automatic action whereby the water in the engine jacket is prevented from becoming too hot so as to cause the engine to be overheated. Furthermore, without the by-pass, if the engine is stopped when it is hot, the hot water will drain out and if the engine is started again the cold water will strike the hot engine and may cause damage. When the by-pass is used, nothing of this kind happens because warm water will be maintained in the reservoir 7 or the pipe 7a, due to the fact that it is below the water level, and when the engine starts up, the warm water will be mingled with cold water so as to prevent the water from being cold enough to injure the engine, and this will continue until the proper amount of cold water is drawn in, whereupon the water will be recirculated as before described.

In marine engines the pumps usually used are the positive pressure type on account of the lift of the water required and the excessive pressure must be relieved by some means. The bypass construction as herein shown accomplishes this purpose, as when the engine jacket is filled with water, the pump then simply recirculates this water without producing any excessive pressure. Furthermore, when the engine is in operation, the warm water is recirculated by means of the by-pass construction herein shown and the only water discharged from the engine jacket is that discharged when the temperature rises above the temperature for which the thermostat is set. When this water is discharged through pipe 9 by the opening of the thermostatically controlled valve, then water is drawn up from the outside source of supply through the strainer to replenish the discharged water. The water in the by-pass mingles with this cold, new water and raises its temperature so that when it enters the engine jacket, the temperature will be comparatively high and will not be much lower than the temperature at the outlet of the engine cooling jacket. In other words, this construction provides a means, when the engine is in operation, for preheating the water before it enters the engine water cooling jacket and utilizes the heat of the engine for this purpose. When the reservoirs 7 and 7a are below the water line, as herein shown, this prevents an air lock, that is it insures the priming of the pump under all conditions. This will be seen when it is noted that the water cannot run out of the reservoir when the engine stops, but there will always be water in the reservoir and a water connection from the pump and the reservoir to the outside source of water.

I claim:

1. A cooling circulating system for marine engines having a water jacket, comprising a water pipe leading from the water in which the boat is located to the water jacket of the engine, a pump in said pipe, a pipe for discharging the water from the engine jacket, when the temperature of the water in the engine jacket reaches a predetermined point, the pump drawing in cold water to replace the water discharged, a by-pass connecting said discharge pipe with the water pipe, and a water reservoir located below the water line and intermediate the by-pass and the water pipe into which warm water from the engine jacket is received and which mixes with the cold water inserted into the engine jacket by the pump, whereby the cold water is tempered to prevent injury to the engine.

2. A cooling circulating system for marine engines, having a water jacket, comprising a water pipe leading from the water in which the boat is located to the water jacket of the engine, a pump in said pipe, a pipe for discharging water from the system when the temperature thereof reaches a predetermined point, means for automatically supplying additional cold water to take the place of the water discharged from the system, a reservoir for warm water, below the water line of the water in which the boat is located, a connection from said reservoir to the pipe leading from the water in which the boat is located to the water jacket of the engine and a pipe leading from the water jacket of the engine to said reservoir to maintain a supply of warm water therein, which mixes with and tempers the additional cold water which takes the place of the water discharged from the system.

HAROLD B. DRAPEAU.